United States Patent [19]

Hinchcliffe et al.

[11] Patent Number: 5,070,991

[45] Date of Patent: Dec. 10, 1991

[54] APPARATUS FOR FORMING GROUPS OF ROD-LIKE ARTICLES

[75] Inventors: Dennis Hinchcliffe, Kent; Desmond W. Molins, deceased, late of London, both of England, by David Oldham Bates, John Anthony William Jennings, legal representative

[73] Assignee: Molins PLC, Saunderton, United Kingdom

[21] Appl. No.: 222,996

[22] Filed: Jul. 22, 1988

[30] Foreign Application Priority Data

Jul. 30, 1987 [GB] United Kingdom ............... 8718085

[51] Int. Cl.⁵ .................................. B65G 47/30
[52] U.S. Cl. ............................. 198/418.3; 53/149; 53/150; 198/429
[58] Field of Search ............. 198/418.1, 418.2, 418.3, 198/429, 433; 414/788.4, 797.9, 794.7; 53/148–151

[56] References Cited

U.S. PATENT DOCUMENTS

| | | | |
|---|---|---|---|
| 3,435,940 | 4/1969 | Seragnoli | 198/418.3 |
| 3,603,445 | 9/1971 | Zausch | 198/418.3 |
| 3,642,112 | 2/1972 | Seragnoli | 198/418.3 |
| 4,306,648 | 12/1981 | Manservisi et al. | 198/418.3 |
| 4,341,298 | 7/1982 | Dingli | 198/418.3 |
| 4,362,235 | 12/1982 | Erdmann | 198/418.3 |
| 4,364,464 | 12/1982 | Manservisi et al. | 198/418.3 |
| 4,526,268 | 7/1985 | Hoffmann et al. | 198/418.3 |
| 4,614,263 | 9/1986 | Nagata et al. | 198/418.3 |
| 4,700,825 | 10/1987 | Mattei et al. | 198/418.3 |
| 4,711,339 | 12/1987 | Nagata et al. | 198/418.3 |

FOREIGN PATENT DOCUMENTS

2138382A 10/1984 United Kingdom .

Primary Examiner—D. Glenn Dayoan
Attorney, Agent, or Firm—John C. Smith, Jr.

[57] ABSTRACT

Successive rows of cigarettes delivered axially from a packing machine hopper outlet (12) are engaged by a cyclically-movable transfer member (24, 32, 425) which accelerates each row sideways and closes up spaces between cigarettes (C) before transferring the row to a conveyor (22) moving continuously at machine speed. The conveyor may be a drum (22) which transfers the cigarettes to a pocket conveyor (62) in which the cigarette bundles are formed, or it may be the pocket conveyor itself. The hopper may have several spaced outlets (12) so that rows may be supplied to the pocket conveyor (62) at spaced locations along its length to provide multi-layer bundles.

20 Claims, 9 Drawing Sheets

APPARATUS FOR FORMING GROUPS OF ROD-LIKE ARTICLES

This invention relates to apparatus for forming groups of rod-like articles, particularly forming groups from rows of cigarettes for subsequent wrapping in a cigarette packing machine.

BACKGROUND OF THE INVENTION

In order to achieve higher speeds in cigarette packing machines it is desirable that as many parts of the machine as possible should operate continuously rather than intermittently. In particlular it is desirable that the conveyor in which the groups of cigarettes are assembled into bundles for subsequent wrapping should run at a constant speed. The present invention is particularly but not exclusively concerned with arrangements suitable for feeding cigarettes to such a conveyor, particularly from a hopper or other region in which the cigarettes have no transverse movement.

SUMMARY OF THE INVENTION

According to a first aspect of the invention apparatus for forming groups of rod-like articles comprises a hopper, means for removing articles from the hopper in an axial direction, variable speed transfer means for receiving successive rows of articles from the removing means, constant speed row conveyor means for receiving rows of articles from the transfer means, and group conveyor means for receiving rows of articles from the row conveyor means. The variable speed transfer means preferably moves between rest and said constant speed. Said transfer means may comprise unidirectional or reciprocable conveyor means. Preferably the row conveyor means comprises at least two spaced row conveyors and the group conveyor receives rows of articles from at least two row conveyors. Where there are at least two row conveyors there may correspondingly be separate parts of the transfer means and removing means associated with each individual row conveyor.

Preferably the transfer means includes means for moving articles into abutment during transfer. This may comprise side guides between which articles may be received from the removing means in spaced positions (e.g. separated by the width of dividing vanes in a hopper outlet), the guides being movable together to close up the spaces between the articles during transfer.

The transfer means may include means for receiving a row of articles in two (or more) spaced portions and for retaining the row in the spaced portions for transfer to the row conveyor means. Separate side guides may be provided for separately moving the articles in each portion of the row into abutment during transfer.

The row conveyor means preferably comprises at least one drum rotatable at constant speed. The drum may have means for receiving a row of articles, and is preferably arranged so that it receives only one or spaced rows, having a length or lengths considerably less than the circumference of the drum, during each revolution. The group conveyor means preferably comprises an endless belt carrying spaced pockets each of which may receive two or more (and preferably three) rows of articles to form a group.

The transfer means and/or the row conveyor may be provided with suction to maintain articles in position during transport and for effecting transfer to or from the transfer means and/or the row conveyor. Alternatively, the articles may be moved between spaced guides while transported by the transfer means and row conveyor.

In one preferred arrangement where the apparatus is incorporated in a cigarette packing machine six equally spaced row conveyors are arranged in series along an upper run of a pocketed group conveyor, the spacing between the row conveyors being equal to that of the spacing betwen pockets on the group conveyor. Alternatively the row conveyors may be arranged in one or more groups of three. Each of the row conveyors may receive cigarettes from vaned hopper outlets forming part of a common multi-outlet hopper. The transfer means may comprise a reciprocable bar carrying a series of fingers for receiving and dragging along a low friction surface rows of cigarettes ejected from each of the hopper outlets. The transfer means may comprise an endless timing belt carrying spaced carriers for each row, the belt being moved unidirectionally past the hopper outlets.

According to another aspect of the invention apparatus for forming groups of rod-like articles comprises means for delivering successive rows of spaced rod-like articles, preferably in a direction parallel to the lengths of the articles, transfer means for receiving each successive row and for moving the row in a direction transverse to its length while changing the spacing between articles of the row, said transfer means being movable at variable speed, a row conveyor for receiving rows of articles from the transfer means at said changed spacing, said row conveyor being movable at substantially constant speed, and a group conveyor for receiving rows from the row conveyor and for assembling at least two rows to form a group of articles.

According to a further aspect of the invention apparatus for forming groups of rod-like articles comprises means for delivering rows of rod-like articles in a direction parallel to their lengths, a plurality of cyclically movable transfer means each for receiving successive rows of articles while stationary and for accelerating said rows to a predetermined speed, and a group conveyor movable substantially at said speed and for receiving rows from at least two of said transfer means to form groups of articles comprising superimposed rows. The transfer means may comprise a transfer drum driven at variable speed, e.g. by a stepper motor, or a reciprocating transfer bar having substantially linear variable speed movement and a transfer drum having a peripheral speed substantially equal to said predetermined speed, the drum receiving successive rows from the transfer bar. Alternatively the reciprocating transfer bar may be replaced by an endless conveyor which moves unidirectionally.

In each of the aspects of the invention the apparatus may be incorporated in a cigarette packing machine in which groups comprising superimposed rows of cigarettes are assembled for wrapping in packing material to form packets of cigarettes.

BRIEF DESCRIPTION OF THE DRAWINGS

The invention will be further described, by way of example only, with reference to the accompanying diagrammatic drawings, in which.

DESCRIPTION OF THE PREFERRED EMBODIMENTS

Figure 1:
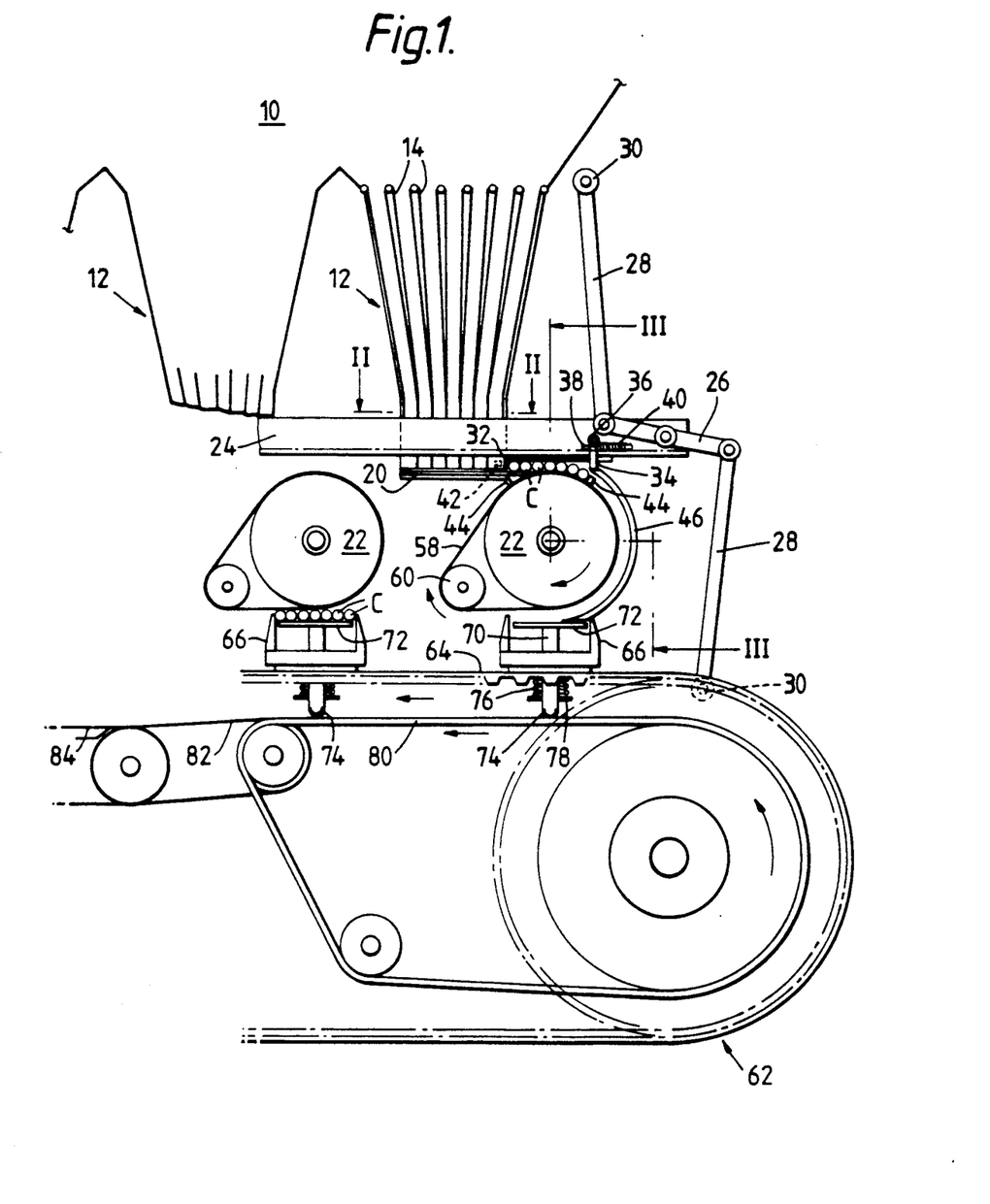
FIG. 1 is a side view of part of a cigarette packing machine.
Figure 2:
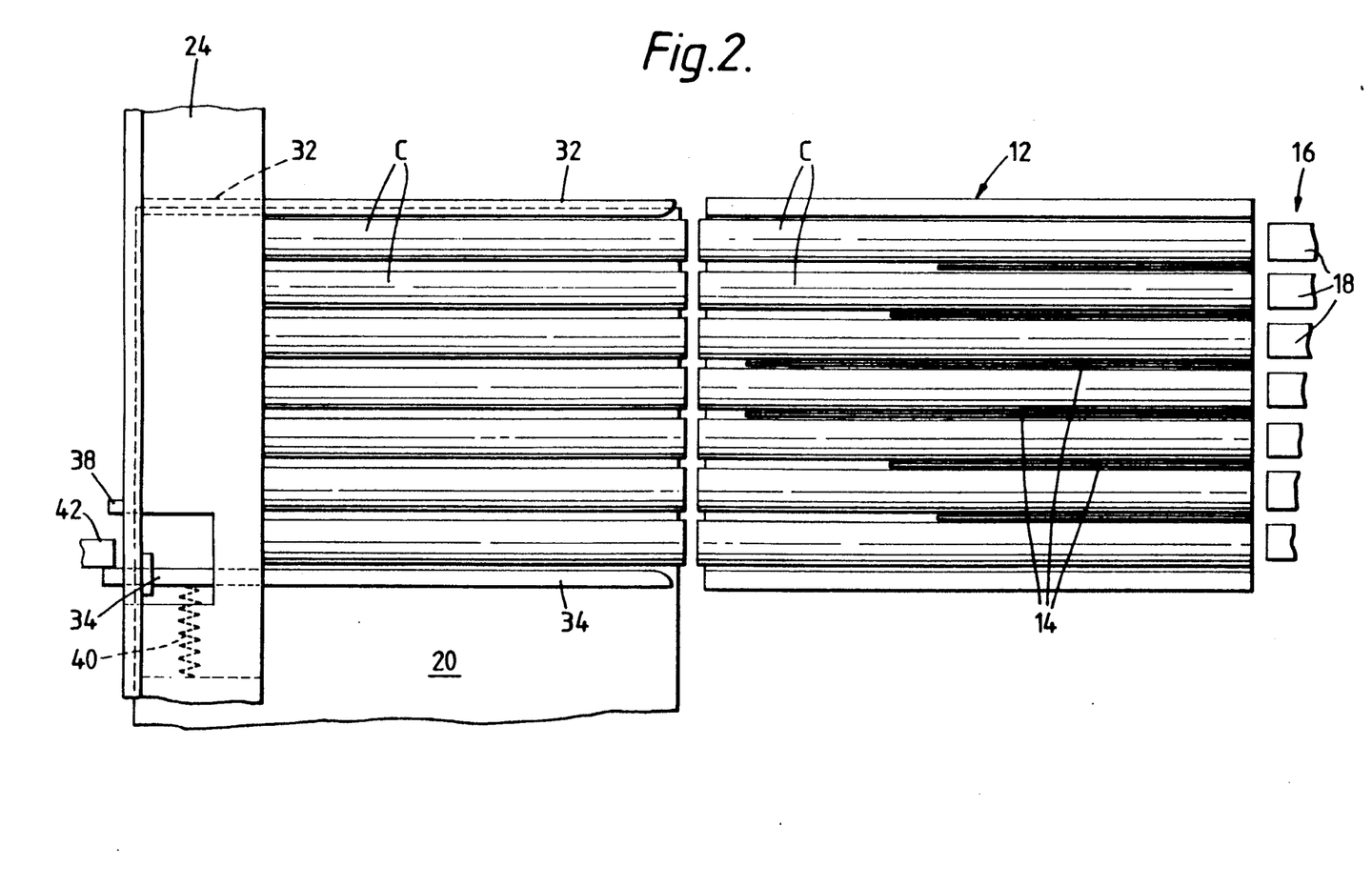
FIG. 2 is a sectional view on the line II—II in FIG. 1.
Figure 3:
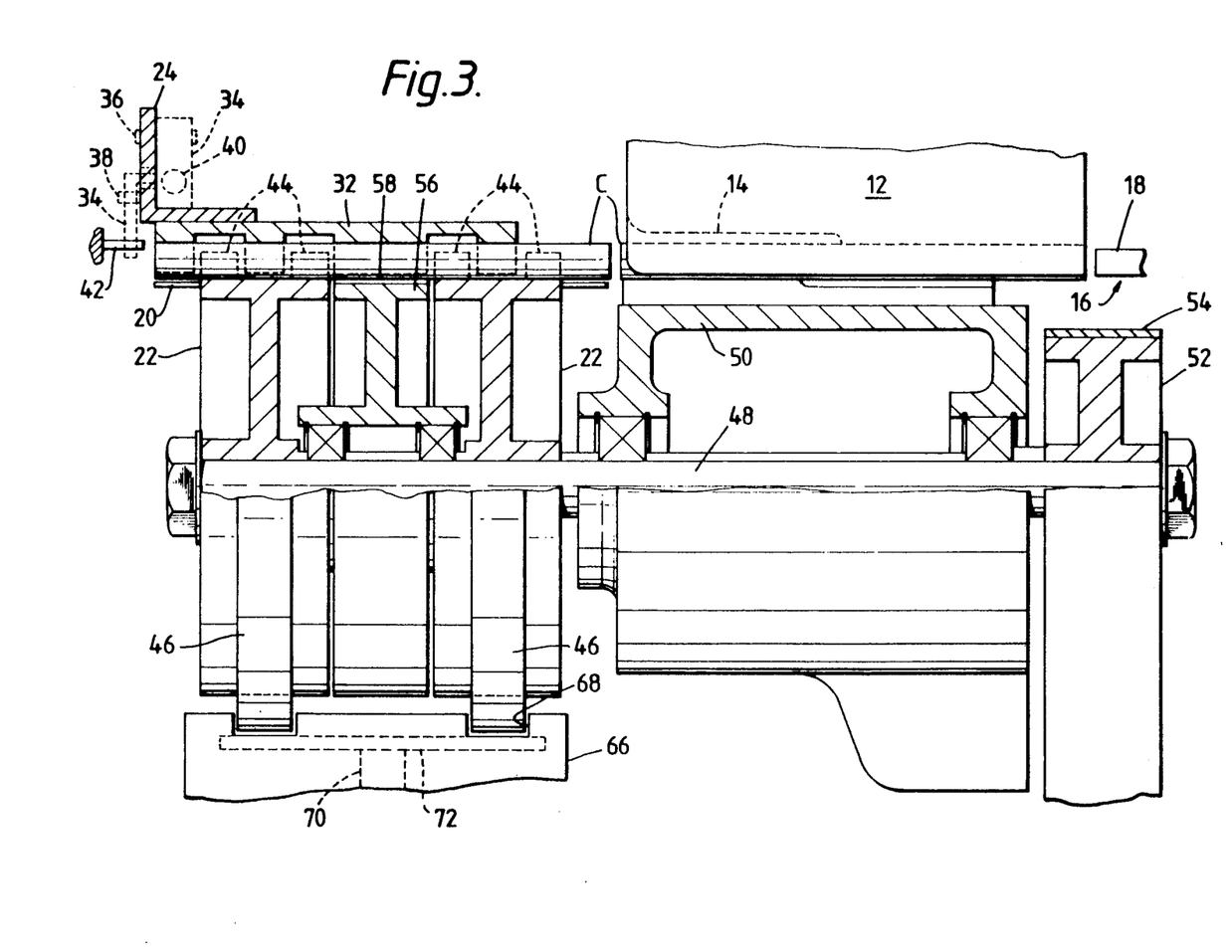
FIG. 3 is a part-sectional view on the line II—II in FIG. 2.

FIGS. 1 to 3 show cigarette conveying apparatus forming an infeed part of a cigarette packing machine. A cigarette hopper 10 is provided with six outlets 12, only two of which are shown in FIG. 1, having internal dividing vanes 14 between which columns of cigarettes C may descend. Aligned with the base of each hopper outlet 12 is a pusher 16 (FIGS. 2, 3) comprising individual fingers 18 movable longitudinally into the outlet between the vanes to axially eject the lowermost cigarette C in each column.

On the side of each hopper outlet 12 opposite the pusher 16 is a platform 20 at a level just below the base of the outlet. The platform 20 extends horizontally, in a direction transverse to the cigarettes in the hopper 10, to the periphery of a rotatable transfer drum 22. A reciprocable transfer bar 24 extends above the platform 20 and is pivotally connected at each end to a drive link 26 (only one of which is shown in FIG. 1) which is itself pivotally connected to further links 28 connected to stationary pivots 30.

Above each platform 20 the undersurface of the transfer bar 24 carries a pair of spaced fingers 32, 34 which each extend parallel to the cigarettes in the hopper 10 and have parts which descend to positions just above the platform 20. The first finger 32 is rigidly fixed to the bar 24 whereas the second finger 34 is pivotally connected to the bar at 36. The transfer bar 24 further carries a stop 38 and a compression spring 40 adjacent each finger 34 and, as shown in FIG. 1, the spring 40 normally urges the finger 34 into a position against the stop 38. During movement of the transfer bar 24 to the left as viewed in FIG. 1 the finger 34 contacts a fixed stop 42 which causes the finger to remain relatively stationary during subsequent movement to the left of the bar, so that the finger is moved away from its stop 38 against the action of the spring 40, to increase the distance between the fingers 32 and 34 as shown in FIG. 2. As seen most clearly in FIG. 3, the stops 38 and 42 in fact engage a part of the finger 34 which extends through a slot in the transfer bar 24.

The transfer drum 22 has a pair of circumferentially spaced radial projections 44. Referring particularly to FIG. 3, each transfer drum 22 comprises axially spaced sections and each projection 44 comprises axially spaced portions on each section of the drum. The fingers 32 and 34 each comprise axially spaced descending portions which may intercalate with the portions of the projections 44. This is shown in FIG. 3, which also indicates in dotted lines the positions occupied by part of the finger 34 and associated elements 36-40 when the transfer bar 24 is moved to the left from its position shown in FIG. 1.

A nitrided steel cowl 46 surrounds part of the periphery of each transfer drum 22. As shown in FIG. 3 the cowl 46 comprises laterally spaced sections. Alternatively the cowl 46 may comprise laterally spaced sections only in the regions which cooperate with the fingers 32, 34 of the transfer bar 24 and with the pocket 66 (see below), the remainder of the cowl consisting of a single surface (i.e. including a portion extending between the sections 46 shown in FIG. 3): this ensures that cigarettes being conveyed by the drums 22 are well supported along their lengths during the major part of their movement on the drums.

The transfer drum 22 is keyed to a drive shaft 48 rotatably supported in a housing 50. Also keyed to the shaft 48 is a pulley 52 around which passes a driven timing belt 54. Coaxial with the shaft 48 and rotatably mounted on it is a further pulley 56, which is located between the sections of the transfer drum 22. A timing belt 58 passes around the drum 56 and also around a further driven pulley 60 (FIG. 1).

A pocket conveyor 62 comprising a timing belt 64 carrying regularly spaced pockets 66 (only two of which are shown in FIG. 1) has an upper run which passes beneath the drums 22. The spacing between the pockets 66 corresponds with that between the drums 22. Each pocket 66 comprises side walls and a base, the side walls being formed with recesses 68 (FIG. 3) which allow them to pass the lower parts of the cowl 46. Extending through the base of each pocket 66 is a plunger 70 at the top of which is a platform 72. The plunger 70 extends downwards beyond the base of the pocket 66 through an aperture in the belt 64 and carries at its lower end 74 a low friction cam surface. A compression spring 76 arranged between the base of the pocket 66 and a support ring 78 connected to the plunger 70 urges the plunger and platform 72 downwards in the pocket 66. The positions which the platforms 72 assume in the pockets 66 shown in FIG. 1 are determined by the upper horizontal run of a driven cam belt 80 on which the cam surfaces 74 rest. Downstream, relative to the direction of movement of the belt 64, are further driven cam belts 82 and 84, the belt 84 being generally horizontal and belt 82 being relatively short and inclined and serving to facilitate smooth transfer of the cam surfaces 74 of successive pockets 66 between the belts 80 and 84.

In operation, cigarettes are delivered to the packing machine, e.g. in trays or as a mass flow stream, and are accumulated in the hopper 10. The cigarettes descend in columns between the vanes 14 of each of the hopper outlets 12. Successive rows comprising the lowermost cigarettes C in each column in a hopper outlet 12 are removed by the pusher 16 in a direction parallel to the lengths of the cigarettes so that each row is received on the adjacent platform 20. At this time the transfer bar 24 is displaced to the left from the position shown in FIG. 1 and is in fact stationary and at its position of maximum displacement to the left. During movement of the bar 24 into this position from the position shown in FIG. 1 the finger 34 encounters the stop 42 which prevents further movement of the finger in the direction of movement of the bar. When the bar 24 reaches its stationary position the finger 32 is aligned with one side of the associated hopper outlet 12 and the finger 34, now displaced from the stop 38 and in contact with the stop 42, is aligned with the other side of the hopper outlet. Thus a row of cigarettes C may be transferred onto the platform 20 between the fingers 32 and 34, as shown in FIG. 2.

Subsequently the bar 24 begins movement to the right (again as viewed in FIG. 1) and during initial movement the spring 40 causes the finger 34 to remain against the stop 42, or at least to move through a lesser distance than the main body of the bar, so that the distance between the fingers 32 and 34 is reduced. The relative movement together of the fingers 32 and 34 under action of the spring 40 causes the cigarettes C on the platform 20 to be moved more closely together. Movement of the finger 34 relative to the bar 24 under action of the spring 40 is limited by the stop 38, which is so positioned that when the finger 34 is in contact with the stop 38 the cigarettes of the row are just in abutment between the fingers 32 and 34. The finger 34 moves from its position abutting the stop 42 to its position on the stop 38 during a relatively short distance of travel of the bar 24 and while the bar is accelerating but still moving relatively slowly, so that the moving together of the cigarettes in a row is relatively gentle.

Instead of being pivotally connected to the transfer bar 24, the finger 34 could be slidably movable relative to the bar, e.g. by connection in a channel portion containing a compression spring.

Further movement of the bar 24 causes the now abutting row of cigarettes C to be dragged across the platform 20 between the fingers 32 and 34 and transferred onto the transfer drum 22 between the projections 44, which are peripherally spaced by a distance corresponding to the length of a row. The row of cigarettes is conveyed between the projections 44 around the drum 22 between its surface and the cowl 46 and transferred onto a platform 72 of a pocket 66 carried by the pocket conveyor 62. The band 58 ensures a smooth transfer to the platform 72, in effect by stripping the cigarettes from the surface of the drum 22.

It will be recalled that the hopper 10 has six outlets 12. These are equally spaced in line but may be regarded as operating in three sets each of two hopper outlets 12. The hopper outlets 12 and the associated drums 22 shown in FIG. 1 operate to transfer first rows of cigarettes C to alternate pockets 66 on the conveyor 62. Thus, the left hand pocket 66 shown in FIG. 1 has already received its first row of cigarettes from the right-hand drum 22. The right-hand pocket 66 will receive its first row from the left-hand drum 22 whereas the row of cigarettes just being transferred to the right-hand drum 22 will be received by the next pocket 66 (not shown).

A second set of hopper outlets 12 and associated transfer drums 22 is arranged to the left of those illustrate-d in FIG. 1 and corresponds in position with the upper run of band 84 by which the platforms 72 of passing pockets 66 are held at a level which is one cigarette diameter below that of the level of the platforms shown in FIG. 1. A second row of cigarettes is thus deposited in alternate pockets 66, on top of the first row, by each of the second set of hopper outlets 12, so that each pocket which has passed the first four hopper outlets (counting from the right in FIG. 1) will have received two rows of cigarettes.

A third and final set of two hopper outlets 12 is arranged further to the left again and corresponds with a further cam belt having a still lower level than the belt 84 so that a third row of cigarettes is transferred to each pocket 66 (each outlet operating on alternate pockets, as before). Each pocket 66 which has passed the complete set of six hopper outlets will have received three rows of cigarettes and subsequently passes to a downstream part of the packing machine where the wrapping process begins.

In order to achieve a standard bundle of 20 cigarettes the rows of cigarettes conventionally comprise respectively seven, six and seven cigarettes. The hopper outlets 12 illustrated in FIG. 1 therefore each have vanes 14 defining seven columns: those in the second set of outlets referred to above would have six columns and those in the third set would again have seven columns.

It will be appreciated that the movements of the pushers 18, transfer bar 24, transfer drums 22 and pocket conveyor 62 are synchronised so that the transfers take place as described. The pushers 18 and the transfer bar 24 are reciprocated with appropriate periods. The transfer drums 22 and the pocket conveyor 62 are driven at constant speed. The speed of the transfer drums 22 is such that the cigarettes C (i.e. their centres) have the same speed as the linear speed of the pocket 66. Since, therefore, the speed at the periphery of the drum 22 is slightly less than the linear speed of the pocket 66, and it is important that the stipper belt 58 should have the same linear speed as the pocket 66, the belt 58 is driven at the appropriate speed independently of the transfer drum 22.

The arrangement of links 26 and 28 connected to the transfer bar 24 provides approximate straight line movement for the bar without additional guides: drive may be by way of a crank (not shown) connected to one of the links 28.

Figure 4A:
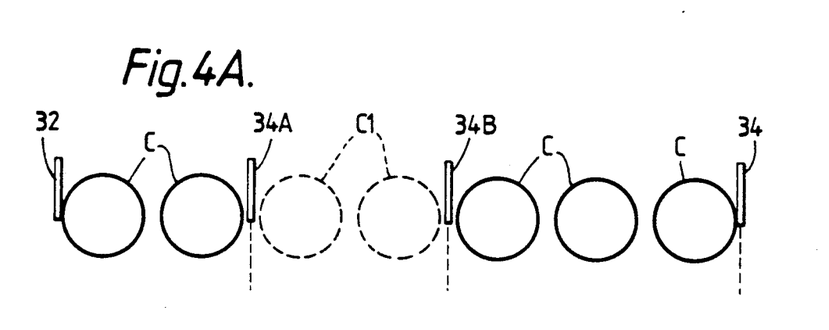
FIGS. 4A, 4B and 4C together illustrate a modification of part of the apparatus of FIGS. 1 to 3.
Figure 4B:
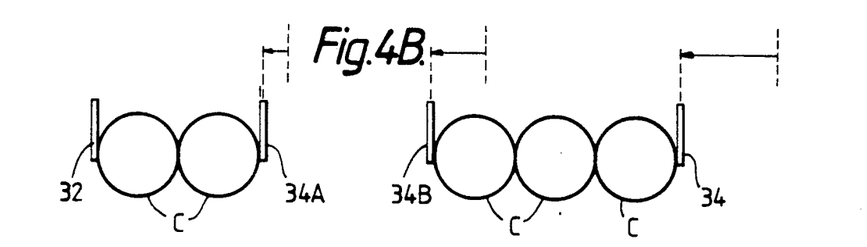
Figure 4C:
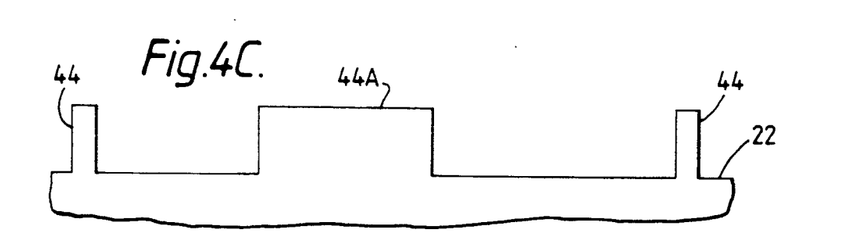

It is sometimes required to provide rows of cigarettes with gaps, so as to produce batches with less than 20 cigarettes, for example. This is often done by omitting one or more cigarettes in the top row of a bundle. The present system may readily be adapted to produce such bundles. FIG. 4A shows a typical arrangement, in which the cigarettes C1 are omitted in the upper row. In the corresponding hopper outlet 12 the columns corresponding to the required gaps are blocked and the corresponding pushers 18 removed. The transfer bar 24 carries two additional moving fingers 34A and 34B. The positions of the fingers 34A and 34B are controlled by stops in the same way as that of the finger 34, so that the cigarettes C close up in two groups after the transfer bar 24 starts to move, as shown in FIG. 4B. The transfer drum 22 carries an elongated stud 44A between the projections 44 and corresponding in position to the gap between the cigarettes C, so that the relative positions of the cigarettes is retained on the drum, as shown in FIG. 4C (in which the curvature of the drum is not shown).

Various other modifications of the arrangement shown in FIGS. 1 to 3 are possible. For example, the transfer drum 22 may be provided with a set of flutes in the position where the cigarettes are received, the flutes therefore replacing the projections 44 and the intervening space. The drum 22 may be a suction drum with appropriate internal manifolds for applying and exhausting suction respectively for receiving and transferring the cigarettes. The cowl 46 would not be necessary with such an arrangement. The transfer bar arrangement may differ from that shown in that guides extending parallel to the cigarettes for maintaining their alignment during and immediately after transfer by the pusher 16 from the hopper outlet 12 may be separate from the transfer bar 24 and arranged to be retracted below the plate 20 to allow subsequent removal of cigarettes towards the drum 22. Thus a simple pull bar arrangement comprising in effect a bar corresponding to the finger 32 and a retractable guide corresponding to the finger 34 could be used. Alternatively a modified transfer bar 24 may comprise an enclosed suction box having flutes on its undersurface provided with suction outlets so that cigarettes may be received and held by the flutes after transfer by the pusher 16. With such an arrangement the plate 20 may carry guides for maintaining alignment of the cigarettes after transfer by the pusher 16 before the suction transfer bar starts to move, the plates and guides being retracted below the line of movement of the cigarettes before the transfer bar starts to move.

It is generally preferred to transfer the cigarettes from the hopper outlets so that they remain parallel to each other and retain their relative spacing when initially received by the transfer bar arrangement. However, it would be possible to plough the cigarettes into abutment during their movement under action of the pusher 16. For this purpose the lowermost portions of the outer vanes 14 should be recessed (as shown in FIGS. 2 and 3) to allow the outer cigarettes to begin inward movement as soon as possible. Even so, where it is required to move the cigarettes into abutment during such longitudinal movement it is necessary to separate the line of the hopper outlet 12 and the transfer bar 24 by a somewhat greater distance than would otherwise be the case, so that the stroke of the pusher 16 is longer: this may be undesirable, particularly where it is required that the packing machine should operate at high speed, since such longer stroke necessarily will take more time or subject the cigarettes to greater acceleration and/or deceleration if the speed of the machine is not to be reduced.

Figure 5:
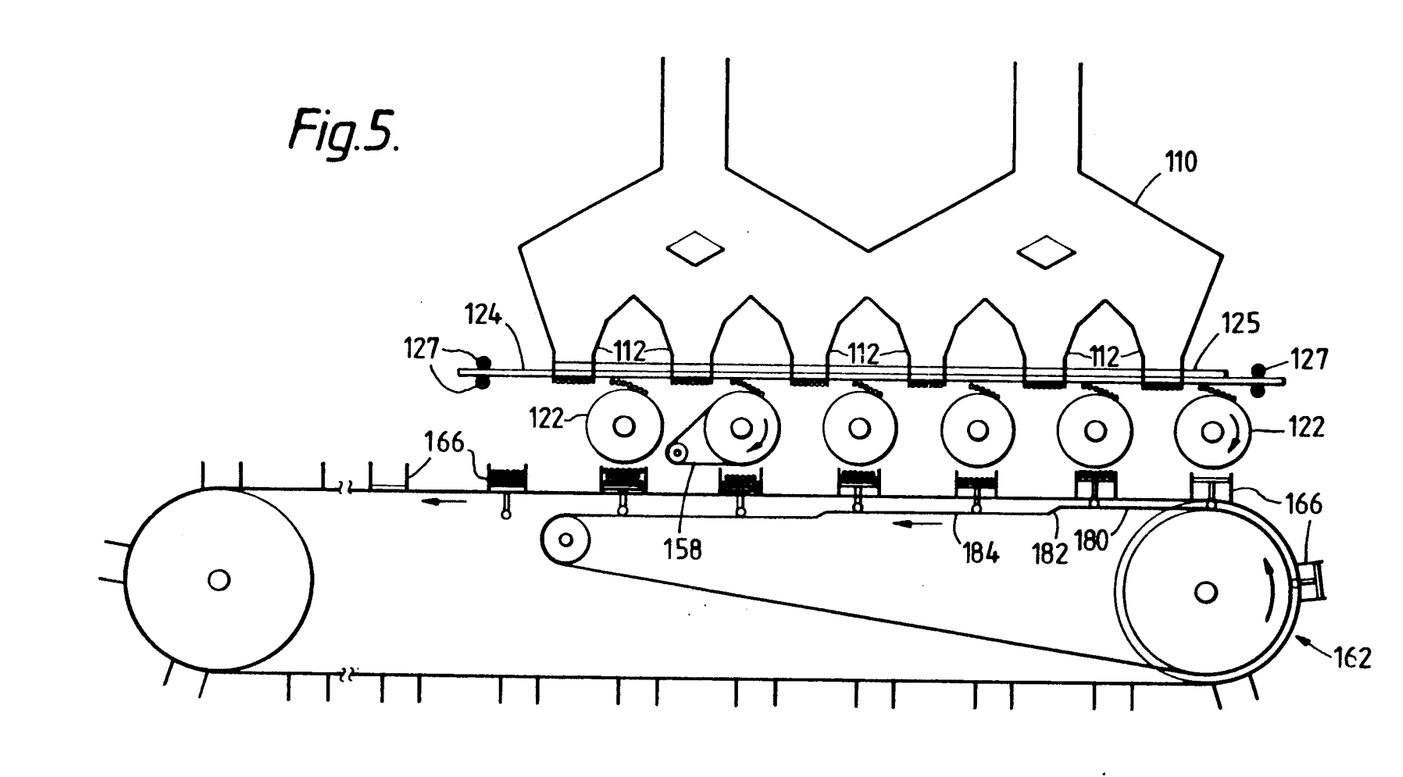
FIG. 5 is a side view of part of another cigarette packing machine.
Figure 6:
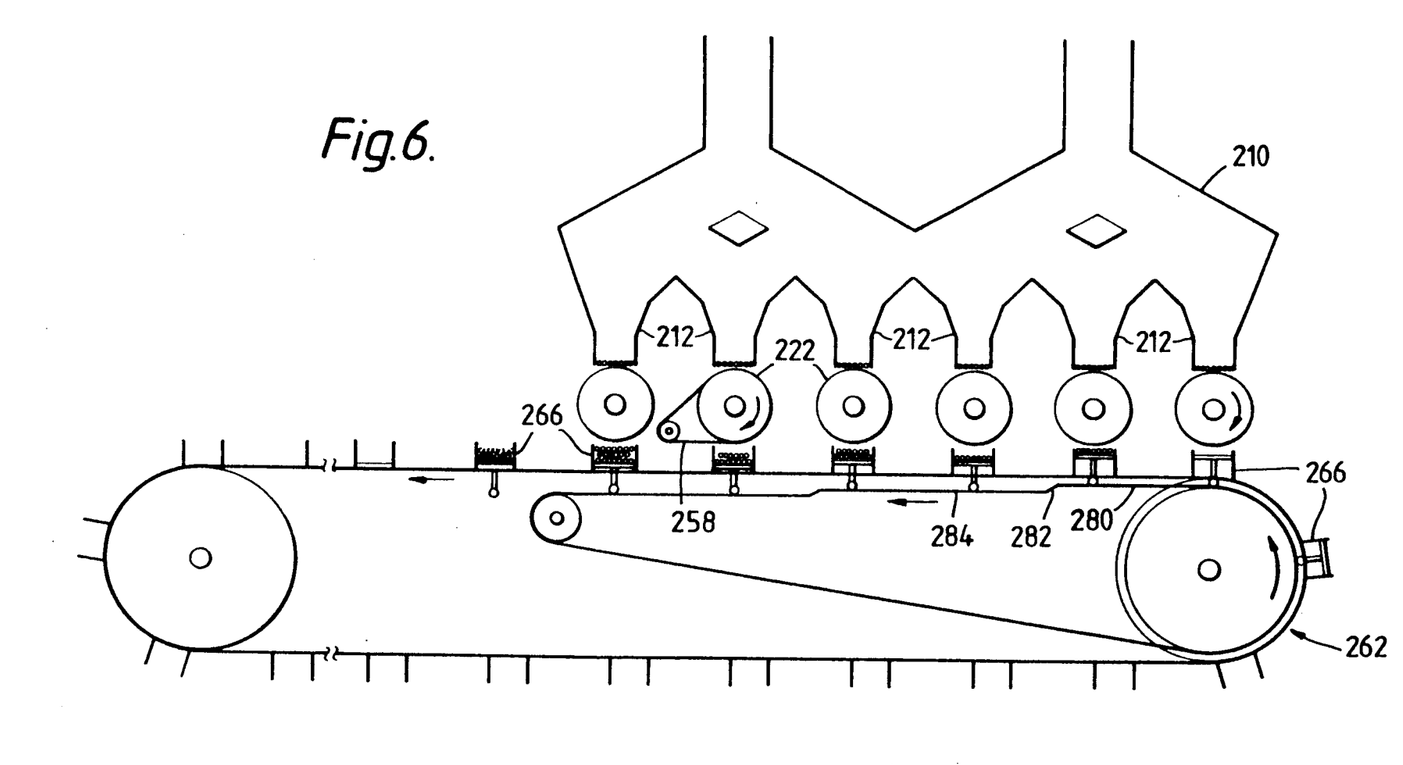
FIG. 6 is a side view of part of a further cigarette packing machine.
Figure 7:
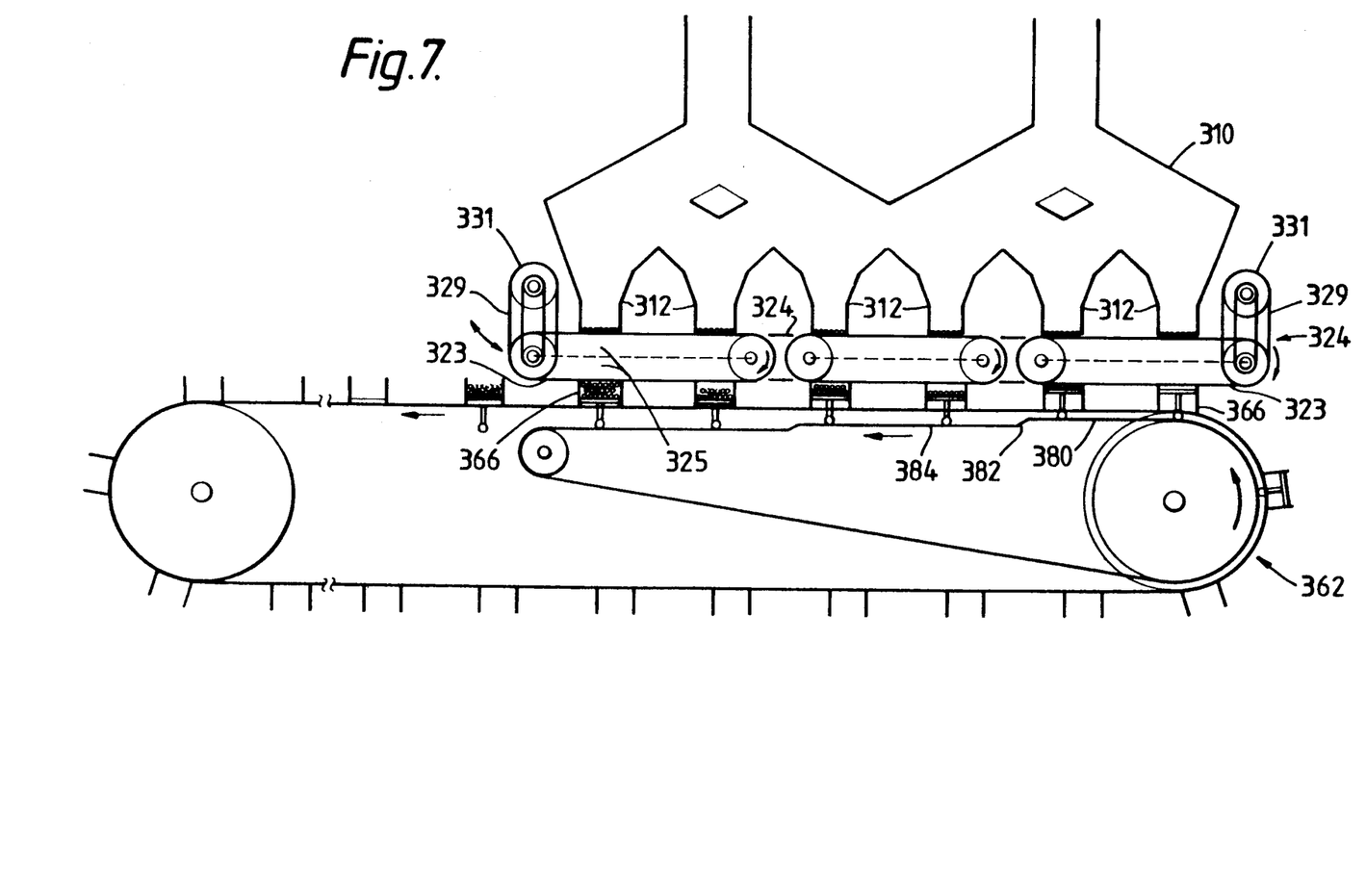
FIG. 7 is a side view of part of a still further cigarette packing machine.

FIGS. 5 to 7 show infeed parts of packing machines which differ from that of FIGS. 1 to 3 in various respects. Parts shown in FIGS. 5 to 7 which generally correspond with parts in FIGS. 1 to 3 have been given reference numbers increased respectively by 100, 200 and 300 and will not necessarily be further described.

In FIG. 5 the transfer bar 124 is formed with flutes on its undersurface and forms a lower wall of a suction chamber 125. The transfer drums 122 each have one set of flutes to receive cigarettes in groups of seven or six from the hopper outlets 112. All of the drums 122 have associated stripper belts 158, although only one of such band is shown: this also applies to the arrangement of FIG. 6. The transfer bar 124 is reciprocated by drive wheels 127 and suction is applied to its flutes for transport of cigarettes from positions aligned with the hopper outlets 112 to the respective drums 122. Suction is applied to the flutes of the drums 122 to carry the cigarettes to the pockets 166 on the pocket conveyor 162. As with the arrangement of FIGS. 1 to 3 the transfer drums 122 and pocket conveyor 162 run at constant speed. The transfer drums 122 each complete one revolution while the transfer bar 124 executes one cycle and the pocket conveyor 162 moves through a distance corresponding to the spacing of alternate transfer drums 122.

Although differing in details FIG. 5 may be taken to indicate the general arrangement of the parts of the hopper 10, transfer drums 22, transfer bar 24, pocket conveyor 62, and associated parts which are not illustrated in FIGS. 1 to 3.

In the arrangement of FIG. 6 groups of cigarettes are pushed directly from the bases of the hopper outlets 212 into fluted suction transfer drums 222. Each of the drums 222 is stationary while it receives cigarettes from the associated hopper outlet 212 and is subsequently accelerated, e.g. by individual stepper motors for each drum, so that it is moving at the speed of the pocket conveyor 262 by the time the cigarettes are transferred to the pockets 266. In this arrangement, therefore, there is no separate element corresponding to the transfer bar 24.

FIG. 7 shows a further modified arrangement in which a transfer bar assembly 324 carries three fluted bands 323. Each of the bands 323 is associated with internal suction chambers 325. The transfer bar assembly 324 is connected by pivotal links 329 to stationary pivot assemblies 331 so that the transfer bar assembly 324 can reciprocate along a slightly curved path. The bands 323 are driven at a constant speed equal to that of the pocket conveyor 362. Cigarettes are transferred from the hopper outlets 312 while the transfer bar assembly 324 is moving to the left at the same linear speed as that of the pocket conveyor 362: thus the upper run of the band 323 is stationary relative to the hopper outlets. The cigarettes are transferred to the pockets 366 while the transfer bar assembly 324 is dwelling at the right: thus the speed of the lower run of the band 323 and the pocket conveyor 362 are equal.

Because the transfer bar assembly 324 reciprocates on a curved path it may be arranged that during transfer of cigarettes from the outlets 312 the upper runs of the bands 323 are aligned with the hopper outlets while the lower runs are spaced slightly upwards from the line of the pockets 366. Subsequently, during transfer of the cigarettes to the pockets 366, the transfer bar assembly 324 is in a slightly lower position with the lower runs of the bands 323 in transfer positions relative to the pockets 366 and the upper runs spaced downwards slightly from the line of the hopper outlets 312. In other words, the distance between the upper and lower runs of the bands 323 is somewhat less than the vertical distance between the hopper outlets 312 and the pockets 366, the curved path of movement of the transfer bar assembly 324 being arranged so that the assembly descends during movement from the position at which the bands 323 receive cigarettes from the outlets and the position (at the extreme right of its travel) at which the cigarettes are transferred to the pockets 366.

Although each band 323 serves two hopper outlets, transfer of successive rows to form a bundle of cigarettes in the pockets 366 is substantially similar to the arrangements including individual transfer drums. Means are provided for controlling suction applied from the chambers 325 to the flutes of the bands 323 so that suction is turned on to receive the cigarettes from the outlets 312 and subsequently turned off to deposit the cigarettes in a pocket 366 with the appropriate timing.

Figure 8:
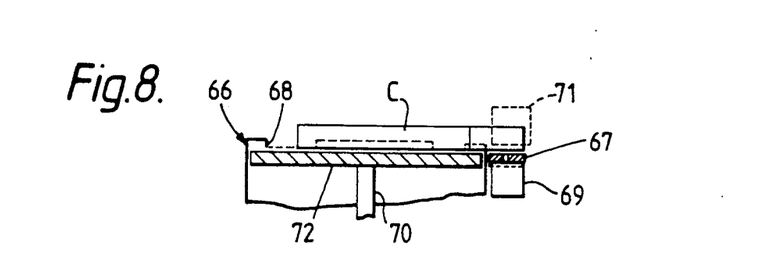
FIG. 8 is a detail sectional view of another modification of part of the apparatus of FIGS. 1 to 3.

FIG. 8 is a sectional view through a pocket 66 showing a modified arrangement in which a suction belt 67 and associated suction manifold 69 extend parallel to the upper run of the pocket conveyor 62 at a level adjacent the tops of the pockets and aligned so that the filter ends of the transferred cigarettes overlie the belt. In effect, this provides a suction transfer to the pockets 66. Downstream of each transfer drum 22 stationary ploughs, indicated at 71 in FIG. 8, acting on the filter ends of the cigarettes C operate to move the cigarettes of each row into full alignment with the pocket 66, preferably before lowering of the platform 72 and in any event before the next row of cigarettes is deposited in the pocket.

It may be noted that in general after the final row of cigarettes has been received in a pocket 66 the platform 72 is lowered so that the top row of cigarettes is just below the level of the recesses 68. This is to avoid any possibility of marking the cigarettes during a subsequent stage when the group of cigarettes in the pocket 66 is subjected to compression in the pocket.

The intercalating parts of the fingers 32, 34 and projections 44 may not be essential. Sufficient control of the cigarettes may be achieved by having fingers 32, 34 extend downwards to just above the centre line of the cigarettes and the projections 44 extend upwards to just below the centre line of the cigarettes. The fingers 32, 34 and projections 44 may have portions provided with radii for contacting the cigarettes.

Infra-red or other non-contact inspection devices, e.g. for detecting soft cigarette ends and missing filter tips, may be provided adjacent the paths of the cigarettes on the transfer drums 22. The inspection devices may be linked to rejection devices, either for individual cigarettes or groups of cigarettes.

Figure 9:
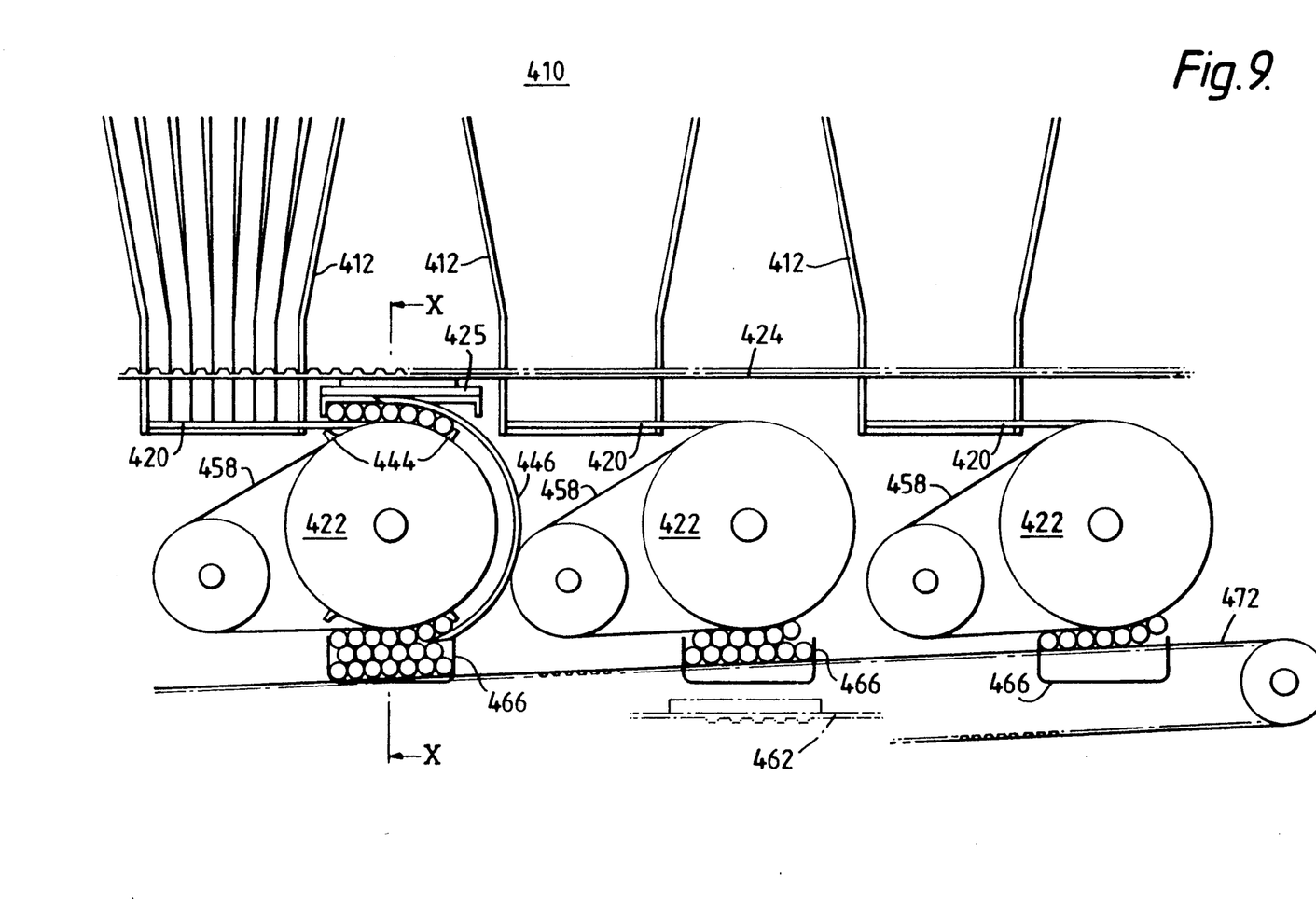
FIG. 9 is a side view of part of another cigarette packing machine.
Figure 10:
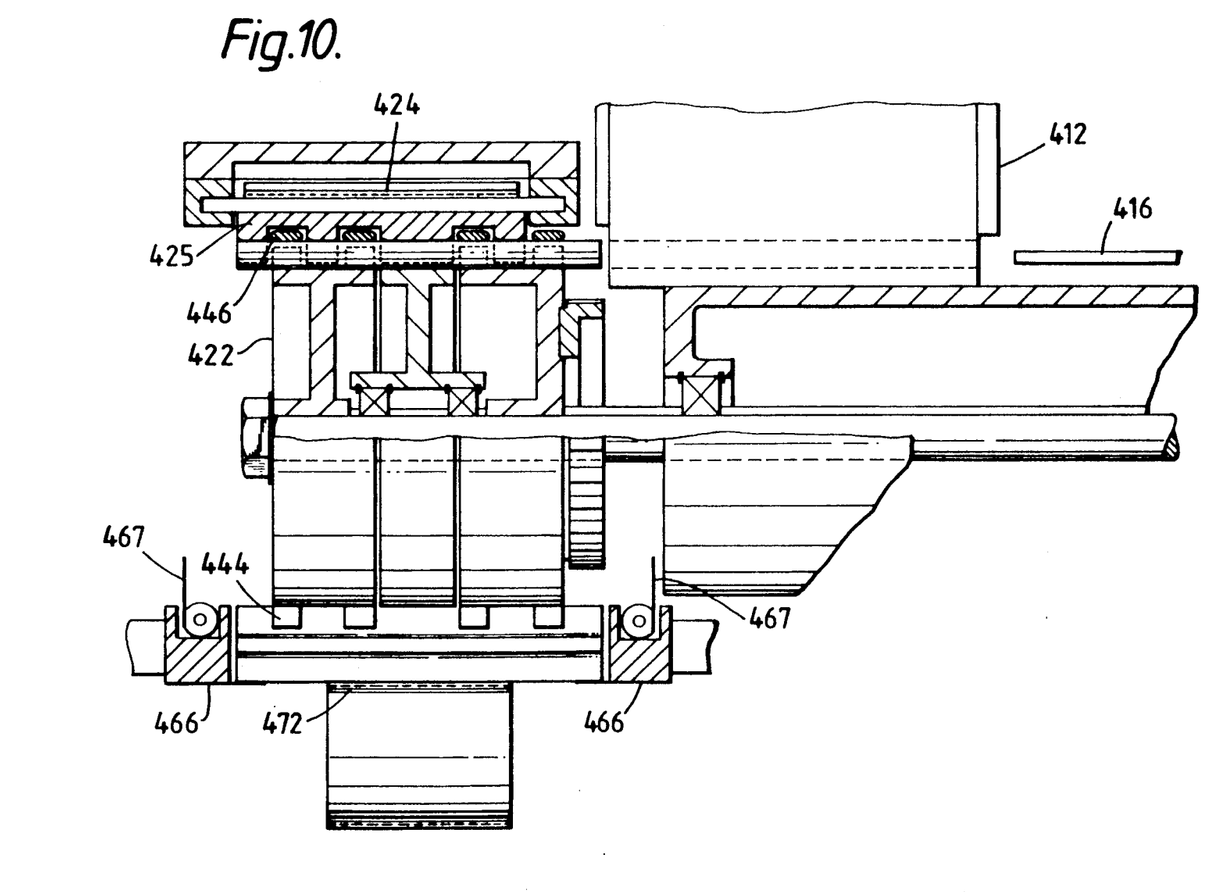
FIG. 10 is a sectional view on the line X—X in FIG. 9.

FIGS. 9 and 10 show part of a modified cigarette packing machine. This machine has basic similarities with that of the previously-described machines and includes parts similar to or analogous with parts in the machine of FIGS. 1-3: these parts have been given corresponding reference numbers increased by 400.

The machine of FIGS. 9 and 10 is a twin track machine. Groups of cigarettes are assembled on parallel tracks for eventual combination in a part of the machine in which groups from both tracks are wrapped. By providing separate tracks only three hopper outlets 412 are required in each track to achieve operating speeds similar to those of the previously-described machines. Each of said machines could in principle be modified to have twin tracks and three hopper outlets per track.

In the machine of FIGS. 9 and 10 rows comprising respectively seven, six and seven cigarettes are simultaneously plunged from each of the hopper outlets 412 by plungers 416 onto smooth plates 420 and under inverted U-shaped drag trays 425 (only one of which is shown in FIG. 9). An indexing timing belt 424 carries the trays 425. After receiving the rows while stationary and aligned with the outlets 412 the trays 425 are accelerated by the belt 424: this closes up the gaps between individual cigarettes in each row which is subsequently delivered onto the respective drum 422 between projections 444 and beneath the cowl 446.

The drums 422 rotate at constant speed and deposit the respective rows on an inclined band 472 which runs between laterally-spaced portions of pockets 466. The band 472 moves at such speed that its component in the direction of movement of the pockets 466 is equal to that of the conveyor 462 carrying the pockets. As shown particularly in FIG. 9, successive rows comprising individual layers of cigarettes are deposited in each pocket 466 to form a group in honeycomb formation.

After each row of cigarettes has been transferred from the tray 425 to its respective drum 422, at which time the tray 425 has a speed equal to the peripheral speed of the drum, the tray begins to decelerate until it is at rest at the next hopper outlet 412. The belt 424 thus moves intermittently past the hopper outlets 412, accelerating from rest up to a predetermined speed and then back to rest again.

When each pocket 466 contains three rows (layers) further movement of the conveyor 462 takes the pocket past means which causes the top plates 467 (FIG. 10) to rotate to retain the cigarettes in the pocket during further conveyance towards the wrapping part of the machine.

We claim:

1. Apparatus for forming groups of rod-like articles comprising a hopper, means for removing articles from the hopper in an axial direction, variable speed transfer means for receiving successive rows of articles from the removing means, constant speed row conveyor means for receiving rows of articles from the transfer means, and group conveyor means for receiving rows of articles from the row conveyor means.

2. Apparatus as claimed in claim 1, wherein the variable speed transfer means includes means movable between rest and said constant speed.

3. Apparatus as claimed in claim 2, wherein the transfer means comprises unidirectional conveyor means.

4. Apparatus as claimed in claim 2, wherein the transfer means comprises reciprocable conveyor means.

5. Apparatus as claimed in claim 1, wherein the row conveyor means comprises said at least two spaced row conveyors and the group conveyor is arranged to receive rows of articles from at least two row conveyors.

6. Apparatus as claimed in claim 1, wherein the transfer means includes means for moving articles into abutment during transfer.

7. Apparatus as claimed in claim 6, wherein the means for moving articles into abutment comprises guides movable together to close up spaces between articles during transfer.

8. Apparatus as claimed in claim 1, wherein the transfer means includes means for receiving a row of articles in two spaced portions and for retaining the row in spaced portions for transfer to the row conveyor means.

9. Apparatus as claimed in claim 1, wherein the row conveyor means comprises at least one drum rotatable at constant speed.

10. Apparatus as claimed in claim 9, wherein the drum includes means for receiving at least one row of articles having a length considerably less than the circumference of the drum.

11. Apparatus as claimed in claim 1, wherein the group conveyor means comprises spaced pockets each of which may receive two or more rows of articles to form a group.

12. Apparatus as claimed in claim 1, including a plurality of said removing means and a corresponding plurality of said row conveyor means.

13. Apparatus as claimed in claim 12, wherein the group conveyor means comprises pockets spaced by a distance corresponding to the spacing between the row conveyor means, whereby each pocket receives superimposed rows from at least two row conveyor means.

14. Apparatus for forming groups of rod-like articles comprising means for delivering successive rows of spaced rod-like articles, transfer means for receiving each successive row and for moving the row in a direction transverse to the lengths of articles of the row while changing the spacing between said articles, said transfer means being movable at variable speed, a row conveyor for receiving rows of articles with said changed spacing from the transfer means, said row conveyor being movable at substantially constant speed, and a group conveyor for receiving rows of articles from the row conveyor and for assembling at least two rows to form a group of articles.

15. Apparatus for forming groups of rod-like articles comprising means for delivering rows of rod-like articles in a direction parallel to their lengths, a plurality of cyclically movable transfer means each for receiving successive rows of articles while stationary and for accelerating said rows to a predetermined speed, and a group conveyor movable substantially at said predetermined speed and for receiving rows of articles from at least two of said transfer means to form groups of articles, each group comprising superimposed rows of articles from different of said transfer means.

16. Apparatus as claimed in claim 15, wherein the transfer means comprises an endless conveyor which moves unidirectionally.

17. Apparatus for forming groups of rod-like articles comprising means for delivering rows of rod-like articles in a direction parallel to their lengths, a plurality of cyclically movable transfer means each for receiving successive rows of articles while stationary and for accelerating said rows to a predetermined speed, said transfer means comprising a transfer drum and means for driving said transfer drum at variable speed, and a group conveyor movable substantially at said predetermined speed and for receiving rows of articles from at least two of said transfer means to form groups of articles comprising superimposed rows.

18. Apparatus for forming groups of rod-like articles comprising means for delivering rows of rod-like articles in a direction parallel to their lengths, a plurality of cyclically movable transfer means each for receiving successive rows of articles while stationary and for accelerating said rows to a predetermined speed, said transfer means comprising a transfer bar and means for reciprocating said transfer bar along a substantially linear path at variable speed, and a group conveyor movable substantially at said predetermined speed and for receiving rows of articles from at least two of said transfer means to form groups of articles comprising superimposed rows.

19. Apparatus for forming groups of rod-like articles comprising means for delivering rows of rod-like articles in a direction parallel to their lengths, a plurality of cyclically movable transfer means each for receiving successive rows of articles while stationary and for accelerating said rows to a predetermined speed, said transfer means comprising a transfer drum and means for driving said transfer drum such that its peripheral speed is substantially equal to said predetermined speed, and a group conveyor movable substantially at said predetermined speed and for receiving rows of articles from at least two of said transfer means to form groups of articles comprising superimposed rows.

20. Apparatus for forming groups of rod-like articles comprising a hopper, means for removing articles from the hopper in an axial direction, variable speed transfer means for receiving successive rows of articles from the removing means, constant speed row conveyor means for receiving rows of articles from the transfer means, and group conveyor means for receiving rows of articles from the row conveyor means and for forming groups from superimposed rows of articles.

* * * * *